(12) United States Patent
Lindstedt et al.

(10) Patent No.: US 12,466,331 B2
(45) Date of Patent: Nov. 11, 2025

(54) METHOD FOR IDENTIFYING A TARGET POSITION OF A DISPLAY- AND/OR CONTROL UNIT IN A HOLDING DEVICE, AND CORRESPONDING DISPLAY- AND/OR CONTROL UNIT

(71) Applicant: Robert Bosch GmbH, Stuttgart (DE)

(72) Inventors: Carsten Lindstedt, Frankfurt am Main (DE); Francesco Carello, Frankfurt am Main (DE); Heiko Michael Schweickhardt, Maintal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 374 days.

(21) Appl. No.: 17/764,648

(22) PCT Filed: Oct. 8, 2020

(86) PCT No.: PCT/EP2020/078238
§ 371 (c)(1),
(2) Date: Mar. 29, 2022

(87) PCT Pub. No.: WO2021/069561
PCT Pub. Date: Apr. 15, 2021

(65) Prior Publication Data
US 2022/0332260 A1    Oct. 20, 2022

(30) Foreign Application Priority Data

Oct. 10, 2019  (DE) .................. 10 2019 215 537.5

(51) Int. Cl.
*B60R 11/02* (2006.01)
*B60R 11/00* (2006.01)
(Continued)

(52) U.S. Cl.
CPC .......... *B60R 11/0229* (2013.01); *B62J 50/22* (2020.02); *B62J 50/225* (2020.02);
(Continued)

(58) Field of Classification Search
None
See application file for complete search history.

(56) References Cited

U.S. PATENT DOCUMENTS 9,891,054 B2     2/2018  Czompo et al.
2011/0141006 A1*  6/2011  Rabu ..................... G01S 19/52
                                                701/532

(Continued)

FOREIGN PATENT DOCUMENTS

DE   202014101923 U1   5/2014
EP         2709870 B1   6/2019
(Continued)

OTHER PUBLICATIONS

International Search Report for PCT/EP2020/078238, Issued Jan. 29, 2021.

*Primary Examiner* — Matthew G Marini
(74) *Attorney, Agent, or Firm* — NORTON ROSE FULBRIGHT US LLP

(57) ABSTRACT

A method, and a device that carries out the method, in which the proper holding and/or orientation of the display and/or control unit in the holding device for the carrying out of the further functions is provided.

10 Claims, 1 Drawing Sheet

(51) Int. Cl.
*B62J 45/20* (2020.01)
*B62J 50/21* (2020.01)
*B62J 50/22* (2020.01)
*H04M 1/72409* (2021.01)
*H04M 1/72412* (2021.01)

(52) U.S. Cl.
CPC . *H04M 1/724098* (2022.02); *H04M 1/72412* (2021.01); *B60R 2011/008* (2013.01); *B62J 45/20* (2020.02)

(56) References Cited

U.S. PATENT DOCUMENTS

| | | |
|---|---|---|
| 2011/0295458 A1 | 12/2011 | Halsey-Fenderson |
| 2013/0295908 A1 | 11/2013 | Zeinstra et al. |
| 2015/0006099 A1 | 1/2015 | Pham et al. |
| 2015/0172432 A1 | 6/2015 | An et al. |
| 2017/0064056 A1* | 3/2017 | Uhlig ............... B60R 11/02 |
| 2017/0166140 A1 | 6/2017 | Lee et al. |
| 2017/0277280 A1 | 9/2017 | Peri et al. |
| 2019/0108412 A1* | 4/2019 | Wang ............... H04N 23/62 |

FOREIGN PATENT DOCUMENTS

| | | | |
|---|---|---|---|
| JP | 2003202229 A | 7/2003 | |
| JP | 2008124959 A | 5/2008 | |
| JP | 2009084929 A | 4/2009 | |
| JP | 2010098356 A | 4/2010 | |
| JP | 2014204242 A | 10/2014 | |
| WO | WO-2018140253 A1 * | 8/2018 | ............ H01Q 1/125 |
| WO | 2019021534 A1 | 1/2019 | |

* cited by examiner

METHOD FOR IDENTIFYING A TARGET POSITION OF A DISPLAY- AND/OR CONTROL UNIT IN A HOLDING DEVICE, AND CORRESPONDING DISPLAY- AND/OR CONTROL UNIT

FIELD

The present invention relates to a method and to a computer program for recognizing a target position of a display and/or control unit in a holding device, and to a corresponding display and/or control unit.

BACKGROUND INFORMATION

Both in the motor vehicle field and in two-wheeled vehicles, there is a need for fastening display and/or control units such as navigation devices, tachometers, or smartphones in the field of view of the user. Many suppliers use a bayonet coupling for this, which first requires the display and/or control unit to be placed in a holder, with subsequent rotation. After the display and/or control unit has been fixed in this way, the user can activate the function of this unit.

SUMMARY

The present invention relates to a method and a device that carries out the method, in which the proper holding and/or orientation of the display and/or control unit in the holding device for carrying out the further functions is provided.

The method according to an example embodiment of the present invention, and a computer program that carries out the method, as well as a device on which the method or the computer program is executed, is suitable for recognizing the target position of a display and/or control unit, for example a locking position, in a holding device. Here, the target position can be defined in such a way that in this target position the display and/or control unit assumes a specified orientation or situation relative to the holding device in which it is held, or arrested or fixed. In addition, it is possible for the target position to be specified in such a way that it enables an optimized data connection between the display and/or control unit and a transmit and/or receive module on or in the holding device. Of course, this optimized data connection can also be enabled to another, or further, transmit and/or receive module that is attached to or integrated on the vehicle to which the holding device is attached.

In accordance with an example embodiment of the present invention, in order to recognize the target position, the method, or the computer program, acquires a first measurement variable of a sensor of the display and/or control unit. Here, essentially a sensor variable is acquired that represents the position or the orientation of the display and/or control unit, for example of a mobile terminal device. In addition, as second measurement variable a transmit signal is acquired of a wireless signal transmission module, for example of a Bluetooth module, that is integrated in the holding device or on the vehicle to which the holding device is attached. The recognition of the target position, or a generation of an item of information as a function of reaching the target position, subsequently takes place via a comparison of the first measurement variable with a first comparison variable, and via a further comparison of the second measurement variable with a second comparison variable.

Thus, for example when the placing of the display and/or control unit into the holder, with subsequent rotational movement in the bayonet coupling, with a simultaneous increase in the receive signal strength of the transmit signal of the wireless signal transmission module, has been recognized, then it is assumed that an arresting, or fixing, of the display and/or control unit in the holding device has taken place. With this recognition, the control function in the display and/or control unit can automatically be activated without the user having to do this manually. In this way, the control function, but also the display function for transmitted information, can be made available more quickly.

With the first measurement variable of the sensor in the display and/or control unit, a location variable or orientation is acquired. This can be for example an orientation of the display and/or control unit, but also a specific location coordinate. In addition, it is possible that a plurality of first measurement variables are also acquired by which a movement of the display and/or control unit can be recognized. This first measurement variable, or the temporal sequence of a plurality of first measurement variables, is subsequently compared to one (or more) comparison variable(s) that correspond to a start position or a fixed position. Thus, for example it can be provided that via the first comparison variable the placing of the display under control unit on a corresponding holder of the holder device is recognized. Alternatively, it is also possible that the first comparison variable represents a first specified orientation of the display and/or control unit relative to the receptacle of the holding device, so that a correct placement in the holding device is recognized.

In an example embodiment of the present invention, it can be provided that the acquisition of a plurality of first measurement variables acquires a change of position of the display and/or control unit, and in particular of a mobile terminal device such as a smartphone. For this purpose, for example the sensor values of an acceleration sensor or of a rotational rate sensor are suitable. However, it is also possible to recognize a movement, in particular a movement to be expected in the holding device, using a light sensor, via the differences in brightness. In this case, the first comparison variable represents the movement of the display and/or control unit, which can be recognized through a comparison with the first measurement variable.

The recognition of reaching the target position additionally takes place through the acquisition of a transmit signal of a wireless signal transmission module, for example of a Bluetooth module, that is attached to the holder device or to a vehicle on which the holder device is fastened. Here, the transmit signal can be acquired by a corresponding receive module in the display and/or control unit. Through the knowledge both of the attachment location of the wireless signal transmission module and of the transmit power of the wireless signal transmission module, a signal threshold value can be defined as a second comparison variable in which the proper holding of the display and/or control unit in the holding device is provided in accordance with the provided target position. If the second measurement variable now exceeds or reaches this signal threshold value, the method, or the system made up of the method or computer program and the display and/or control device, can assume that the display and/or control device is in the specified target position.

Optionally, in accordance with an example embodiment of the present invention, it can be provided that a further condition has to be met before the method recognizes the target position. Here, the holding device can have electrical contacts that do not enter into an electrical effective connection with electrical contacts of the display and/or control unit until the target position is reached. This can be achieved for example in that connecting elements of the mobile terminal device contact corresponding connecting elements of the holding device. If here the display and/or control unit, or the holding device, carries out a current, voltage, or resistance measurement at these electrical contacts, such contact, and thus the target position, can be recognized.

In a particular example embodiment of the present invention, it is provided that there is an existing wireless connection between the display and/or control unit and the holding device, or wireless signal transmission module, before placement into the holding device. Here, via the wireless connection the first and/or second comparison variable can be transmitted by which the placing and the reaching of the target position can be recognized. The advantage of such a transmission of the corresponding comparison variables from the holding device, or the vehicle to which the holding device is fastened, to the display and/or control unit is that the transmitted comparison variables can contain the specific geometries and conditions as they exist at the holding device. Thus, the second comparison variable can contain a signal threshold value calibrated to the geometrical distance that is to be maintained and is required between the target position and the Bluetooth module.

Optionally, it can be provided that the first and/or second comparison variable has a value range, for example 1%, 2%, 5%, or 10%, around a mean value. In this way, manufacturing tolerances or varying installation conditions of the holding device on the vehicle can be compensated.

The present invention can be used particularly advantageously in two-wheeled vehicles, such as bicycles and electric bicycles. Thus, for example the use of a smartphone can be used as a speed display or as a control unit for the electric motor. However, for this purpose a correspondingly secure holding in the associated holding device is necessary in order to prevent undesirable damage due to falling out or due to an imprecise fixing. In addition, especially in the case of wireless data transmission, for example via Bluetooth, a defined signal strength is desirable in order to ensure the controlling, but also the feedback of the data from the two-wheeled vehicle. For this purpose, a minimum strength of signal reception is required that is achieved through a targeted setting of a minimum distance from the transmit module in the holding device to the receive module of the smartphone. The same of course also holds for the transmission of the control signals from the smartphone to the receive module of the Bluetooth module.

BRIEF DESCRIPTION OF THE DRAWINGS

The schematic diagram in FIG. 1 schematically shows an evaluation unit according to an example embodiment of the present invention as may be present for example in a display and/or control unit. An example embodiment of the method according to the present invention is shown in the flow diagram of FIG. 2.

DETAILED DESCRIPTION OF EXAMPLE EMBODIMENTS

Figure 1:
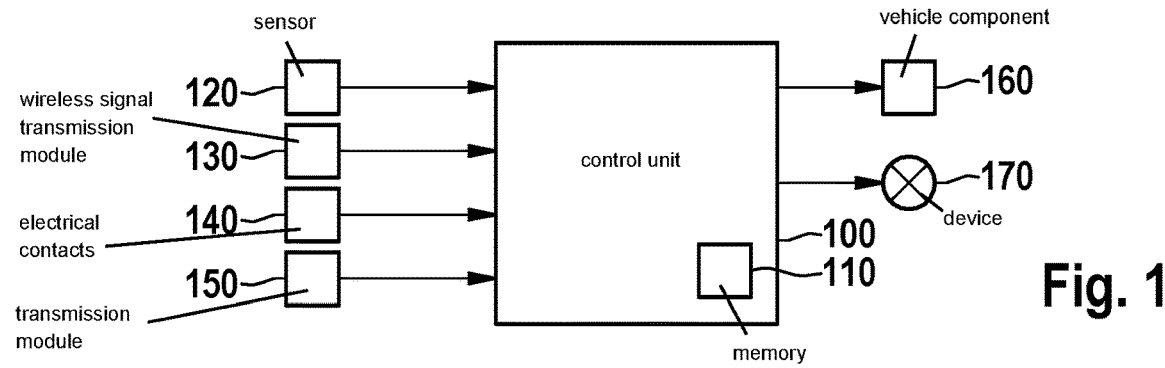
Figure 2:
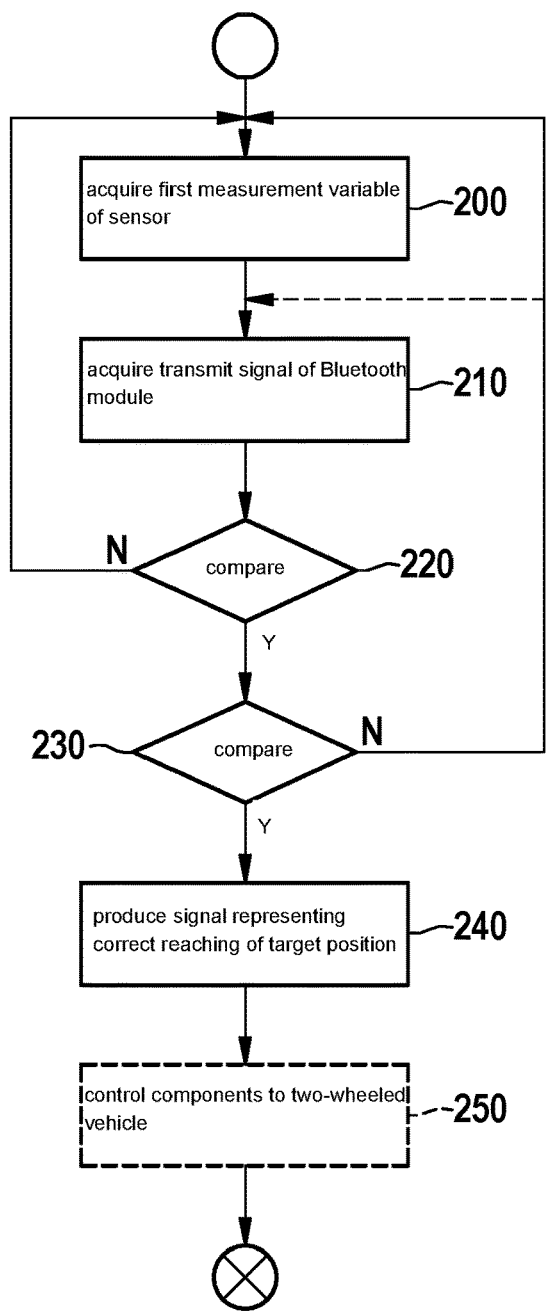

On the basis of the schematic diagram of FIG. 1, the design is now described of a device that carries out the method according to an example embodiment of the present invention, or the corresponding computer program. Here, a control unit 100 is provided that is suitable for evaluating the acquired measurement variables. This control unit 100 can be attached to a holding device as a self-contained unit, or can be part of a higher-order device that is attached in the holding device and is finally arrested or fixed there. In particular, it can be provided that control unit 100 is part of the display unit, for example of a speed indicator. In addition, control unit 100 can also be part of a mobile terminal device such as a smartphone.

Control unit 100 optionally has a memory 110 in which comparison variables can be stored for carrying out the method, or for recognizing the target position. In addition, control unit 100 acquires first measurement variables of a sensor 120 that is in display and/or control unit 100, or in the mobile terminal device. This can be an acceleration sensor, a rotational rate sensor, a position sensor, an inclination sensor, a sensor for acquiring an angle, or also a GPS or some other location identification module. In addition, control unit 100 acquires second measurement variables of a wireless signal transmission module 130, for example a Bluetooth module, that is provided on the holding device in which display and/or control unit 100 is to be placed. Alternatively, the wireless signal transmission module can also be attached, separately from the holding device, to a vehicle on which the holding device is fastened. In addition, it is optionally possible for an electrical connection to be acquired via electrical contacts 140 on display and/or control unit 100. In addition, a wireless connection can optionally be provided by which wireless signal transmission module 130, or another transmission module 150, transmits corresponding first and/or second comparison variables to the display and/or control unit. The comparison variables sent out in this way and received and stored by display and control unit 100 can thus be individually adapted to the provided dimensions, geometries, and/or situations of the holding device, and to the situation of wireless signal transmission module 130 on the vehicle.

After the recognition that display and/or control unit 100 has reached the target position in the holding device, the evaluation unit in display and/or control unit 100 can automatically control a function of display and/or control unit 100, or of a component 160 of the vehicle. Optionally or in addition, the user can also be informed about the recognition of the reaching of the target position optically or acoustically, by a corresponding device 170.

The target position can be defined as a locking position of display and/or control unit 100 in the holding device in which position display and/or control unit 100 is arrested or fixed. In this way, display and/or control unit 100 is prevented from being removed without further action by the user, or from falling out of the holding device. In addition, the target position can be defined as a preferred orientation of display and/or control unit 100 in the holding device. Thus, it can for example be provided that, given the use of a smartphone, the screen is deliberately attached in the holding device lengthwise in order to offer as wide a display as possible. Such displays are required for example for navigation purposes. Alternatively, it can be provided that the screen is to be oriented in the longitudinal direction in order to take up as little space as possible on the handlebar of a two-wheeled vehicle.

After the start of the method or of the computer program, in a step 200 at least one first measurement variable of a sensor 120 in display and/or control unit 100 is acquired. This first measurement variable can be for example a sensor variable of an acceleration sensor, of a rotational rate sensor, of a brightness sensor, in general of a position sensor, or of an inclination sensor. Of course, a combination of sensor variables can also be acquired in order to detect the orientation and/or positioning of display and/or control unit 100 in relation to the holding device. In a further step 210, a transmit signal of a Bluetooth module 130 is acquired. Here, the two steps 200 and 210 can be acquired one after the other, in parallel, or independently of the following evaluation of the measurement variables starting from step 220. In addition, it is possible that a plurality of measurement variables are acquired in order to acquire a temporal change in the measurement variables. In this way, a movement of display and/or control unit 100, or a change in the signal strength of wireless signal transmission module 130, can be recognized.

In order to evaluate the acquired first and second measurement variables, in step 220 the first measurement variable is compared to a first comparison variable. In this way, it can be determined whether display and/or control unit 100 has been placed in the holding device. Through the further acquisition of first measurement variables of the same or of another sensor, it can be recognized whether the movement of display and/or control unit 100 is suitable to enable the arresting and/or fixing in the holding device. Thus, through the sensor variables a rotation can be recognized that is typical for the use of a bayonet coupling. However, the sensors can also recognize a sliding movement that is also used in some conventional holding designs. If no typical movement is recognized for the arresting or fixing of display and/or control unit 100 in the holding device through the comparison in step 220, then the method can be run through again with the acquisition of the first measurement variables.

In a further step 230, the acquired second measurement variable is compared with a second comparison variable. Here, the second comparison variable is a minimum signal strength that has to be reached in order to recognize a secure arresting of display and/or control unit 100 in the holding device. At the same time, the minimum signal strength also ensures that the wireless transmission is adequate for the transmission of control signals and for the reception of operating parameters. Step 230 can take place both before or after step 220, or also independent of this step. If it is recognized that the minimum signal strength has not been reached, then the acquisition of measurement variables can be begun again in step 200, or alternatively only new second measurement variables can be acquired in step 210.

If in step 220 it is recognized that a movement suitable for arresting has been carried out, and if the transmit strength of the received signal of the wireless signal transmission module is above a minimum signal strength, then in the following step 240 a signal is produced that represents the correct reaching of the target position, the locking position, or the desired orientation of display and/or control unit 100. This signal can be communicated to the user of the vehicle optically or acoustically.

In a further specific embodiment of the present invention, the first and/or second comparison variable can be indicated as a size interval. Thus, it is possible for the minimum signal strength to be regarded as reached, starting from a mean value, if the deviation from the mean value is 1%, 2%, 5%, or 10%. Optionally, such an increase in the tolerance for the recognition of the target position can also be selected by the user. This case is possible for example if the holding device is attached to the vehicle separately from the Bluetooth module, for example on the handlebar, and the distance has to be made larger for reasons of space.

Optionally, in a further step 250, starting from the recognition of the reaching of the target position a controlling of components of the two-wheeled vehicle to which the holding device is attached can take place. Thus, for example the motor of an electric vehicle can automatically be put into operational readiness in order to permit uncomplicated starting. Alternatively or in addition, the initialization of the connection of a wireless connection to a cloud server can also be initiated.

What is claimed is:

1. A method for recognizing a target position of a display and/or control unit of a mobile terminal device, in a holding device, the method comprising:
    acquiring at least one measurement variable of a sensor of the display and/or control unit;
    acquiring a second measurement variable of a transmit signal of a wireless signal transmission module of the holding device, the signal transmission module being of a Bluetooth module;
    producing an item of information about a reaching of the target position of the display and/or control unit in the holding device, the target position being a locking position, the item of information being produced as a function of:
        a comparison of the first measurement variable with a first comparison variable, and
        an exceeding of a second comparison variable by the second measurement variable; and
    determining whether the display and/or control unit is properly positioned or locked into place in the holding device, based on the item of information produced,
    wherein the first measurement variable represents a location coordinate of the display and/or control unit.

2. The method as recited in claim 1, wherein:
    the first comparison variable represents a start position, the start position being a first specified orientation of the display and/or control unit in relation to a receptacle of the holding device.

3. The method as recited in claim 1, wherein:
    the first measurement variable acquires a change in position of the display and/or control unit, in the form of an acceleration value or a yaw rate; and
    the first comparison variable represents a temporal curve of the first measurement variable and/or a movement of the display and/or control unit.

4. The method as recited in claim 1, wherein the second comparison variable represents a signal threshold value, it being provided that the signal threshold value is specified as a function of a nearing of the wireless signal transmission module.

5. The method as recited in claim 1, wherein the target position of the mobile terminal device in the holding device is recognized as a function of a detection of an electrical contact between the display and/or control unit and the holding device.

6. The method as recited in claim 1, wherein the first and/or second comparison variable is transmitted by a transmission from the holding device to the display and/or control unit, via the transmit signal of the wireless signal transmission module.

7. A non-transitory computer-readable medium on which is stored a computer program for recognizing a target position of a display and/or control unit of a mobile terminal device, in a holding device, the computer program, when executed by a computer, causing the computer to perform the following steps:
    acquiring at least one first measurement variable of a sensor of the display and/or control unit;
    acquiring a second measurement variable of a transmit signal of a wireless signal transmission module of the holding device, the signal module being a Bluetooth module, and the second measurement variable of the transmit signal being a signal strength;

producing an item of information about a reaching of the target position of the display and/or control unit in the holding device, the target position being a locking position, the item of information being produced as a function of:

a comparison of the first measurement variable with a first comparison variable, and an exceeding of a second comparison variable by the second measurement variable; and determining whether the display and/or control unit is properly positioned or locked into place in the holding device, based on the item of information produced, wherein the first measurement variable represents a location coordinate of the display and/or control unit.

8. The computer program as recited in claim 7, wherein the computer program acquires the first and/or second comparison variable by a transmission from the holding device, via the transmit signal of the wireless signal transmission module.

9. A display and/or control unit of a mobile terminal device configured to recognize a target position of a display and/or control unit of a mobile terminal device, in a holding device, the display and/or control unit configured to:

acquire a first measurement variable of a sensor of the display and/or control unit, the first measurement variable being a location variable;

use a receive module to acquire a second measurement variable of a transmit signal of a wireless signal transmission module of the holding device, the signal transmission module being of a Bluetooth module, the second measurement value being a signal strength;

produce an item of information about a reaching of the target position of the display and/or control unit in the holding device, the target position being a locking position, the item of information being produced as a function of:

a comparison of the first measurement variable with a first comparison variable, and an exceeding of a second comparison variable by the second measurement variable; and determining whether the display and/or control unit is properly positioned or locked into place in the holding device, based on the item of information produced, wherein the location variable includes a location coordinate of the display and/or control unit.

10. The display and/or control unit as recited in claim 9, wherein the display and/or control unit acquires the first and/or second comparison variable via a transmission from the holding device, via the transmit signal of the wireless signal transmission module.

* * * * *